United States Patent [19]

Johnson

[11] Patent Number: 5,377,947
[45] Date of Patent: Jan. 3, 1995

[54] BATTERY HOLDDOWN

[76] Inventor: Jerome Johnson, Rte. 4, Box. 4022, Hayward, Wis. 54843

[21] Appl. No.: 110,363

[22] Filed: Aug. 23, 1993

[51] Int. Cl.⁶ .............................................. A47B 97/00
[52] U.S. Cl. .................................. 248/503; 248/231.4; 248/298; 120/68.5
[58] Field of Search ................... 248/213.2, 503, 231.4, 248/500, 298; 180/68.5

[56] References Cited

U.S. PATENT DOCUMENTS

| | | | |
|---|---|---|---|
| D. 321,856 | 11/1991 | Whitley, II et al. | 180/68.5 X |
| 457,781 | 8/1891 | Josef | 248/231.8 X |
| 833,613 | 10/1906 | Maiser | 248/298 |
| 2,415,284 | 2/1947 | Holman et al. | |
| 2,517,927 | 8/1950 | Reed | 218/231.8 X |
| 2,812,918 | 11/1957 | Longino | 248/298 |
| 2,849,074 | 8/1958 | Key et al. | |
| 2,853,143 | 9/1958 | Bergman | |
| 3,498,400 | 3/1970 | Hysmith | |
| 3,557,895 | 1/1971 | Thomas | |
| 3,826,115 | 7/1974 | Davis | |
| 3,834,479 | 9/1974 | Bowers et al. | |
| 3,856,248 | 12/1974 | Labelle | 248/201 X |
| 3,866,704 | 2/1975 | Bowers et al. | |
| 4,252,206 | 2/1981 | Burkholder et al. | |
| 4,565,256 | 1/1986 | Valdez | 248/503 X |
| 4,754,827 | 7/1988 | Hirabayashi | |
| 5,052,198 | 10/1991 | Watts | |
| 5,228,532 | 7/1973 | Browning et al. | 180/68.5 |

Primary Examiner—Ramon O. Ramirez
Assistant Examiner—Korie H. Chan
Attorney, Agent, or Firm—Peterson, Wicks, Nemer & Kamrath

[57] ABSTRACT

A battery holddown (10) is disclosed including first and second brackets (16, 18) of identical construction. The brackets (16, 18) each includes a generally L-shaped clamp (20) having top and side plates (22, 24) for abutting with the top and sides of the battery. Ears (26) extend from the side plates (24) and include apertures (36) for slideable receipt of bolts (12) extending from the battery tray (14). The brackets (16, 18) each further includes a cross rod (28) including a vertical portion (32) extending from the top plate (22) and a horizontal portion (30) extending from the vertical portion (32). A U-shaped channel is formed by an L-shaped land (44) extending from the horizontal portion (30) adjacent its end and is of a size and shape for slideable receipt of the horizontal portion (30) of the other bracket (16, 18). The channels bind on the horizontal portions (30) when the first and second brackets (16, 18) are drawn toward the battery tray (14) by tightening nuts (50) on the bolts (12) to prevent sliding or other relative movement of the brackets (16, 18) relative to each other.

22 Claims, 1 Drawing Sheet

BATTERY HOLDDOWN

BACKGROUND

The present invention generally relates to devices for restraining objects of different sizes, particularly to devices for restraining batteries of different widths, and more particularly to battery holddowns for batteries supported in a battery tray.

A conventional manner for restraining batteries such as in the automotive industry is to support the battery in a tray and utilize a battery holddown which abuts the top of the battery and is drawn toward the tray utilizing bolts. It can also be appreciated that batteries come in a variety of case sizes depending upon the power requirements, the particular battery design, and the like and also depending upon the particular manufacturer. Often a replacement or substitute battery would be of a different case size than the original battery such that the holddown for the original battery would not be usable for the replacement or substitute battery. Thus, added expense was encountered by the automobile owner because in addition to the battery, at least the holddown of the battery restraint system also had to be replaced. Additionally, added expense to the manufacturer and supplier of battery holddowns occurred as battery holddowns for all sizes of batteries manufactured were generally required to be maintained in inventory.

Although known, adjustable battery holddowns to fit different sizes of batteries in the past have not achieved the same commercial success as nonadjustable battery holddowns. Particularly, the adjustment mechanisms of prior adjustable battery holddowns were typically of a complicated design and were susceptible to corrosion from battery acid and other elements in the environment. Although adjustable when manufactured, corrosion often locked components together or otherwise prevented adjustment such that replacement was necessary if a different size battery was desired to be held. Additionally, some adjustable battery holddowns were adjustable in only a single direction such as length such that they could not be utilized with batteries of different sizes in the direction which they were not adjustable.

Thus, a need continues to exist for an improved battery holddown which is able to restrain batteries of different sizes and which overcomes the problems which were encountered by prior adjustable battery holddowns.

SUMMARY

The present invention solves this need and other problems in the field of devices for restraining batteries by providing a battery holddown including, in the preferred form, first and second brackets each having a cross rod extending over the top of the battery and slideably received in a channel of the other bracket which bind upon the cross rod when the first and second brackets are drawn toward the battery, with the brackets including parts which abut with the top and sides of the battery. In the preferred form, the brackets are of an identical construction, and the channel is generally U-shaped having an open end to allow assembly of the brackets by simply pivoting and sliding them together.

It is thus an object of the present invention to provide a novel battery holddown.

2

It is further an object of the present invention to provide such a novel battery holddown which fits different sizes of batteries.

It is further an object of the present invention to provide such a novel battery holddown including cross rods which extend across the top of the battery and are slideable relative to each other but bind together when drawn toward the battery.

It is further an object of the present invention to provide such a novel battery holddown which is not susceptible to locking at fixed positions due to corrosion or the like.

It is further an object of the present invention to provide such a novel battery holddown including first and second brackets which are assembled without the use of tools.

It is further an object of the present invention to provide such a novel battery holddown including first and second brackets which are assembled by simply pivoting and sliding them together.

It is further an object of the present invention to provide such a novel battery holddown including first and second brackets which are of identical construction.

It is further an object of the present invention to provide such a novel battery holddown including first and second brackets including open ended cavities for slideable receipt of the cross rods.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

Figure 1:
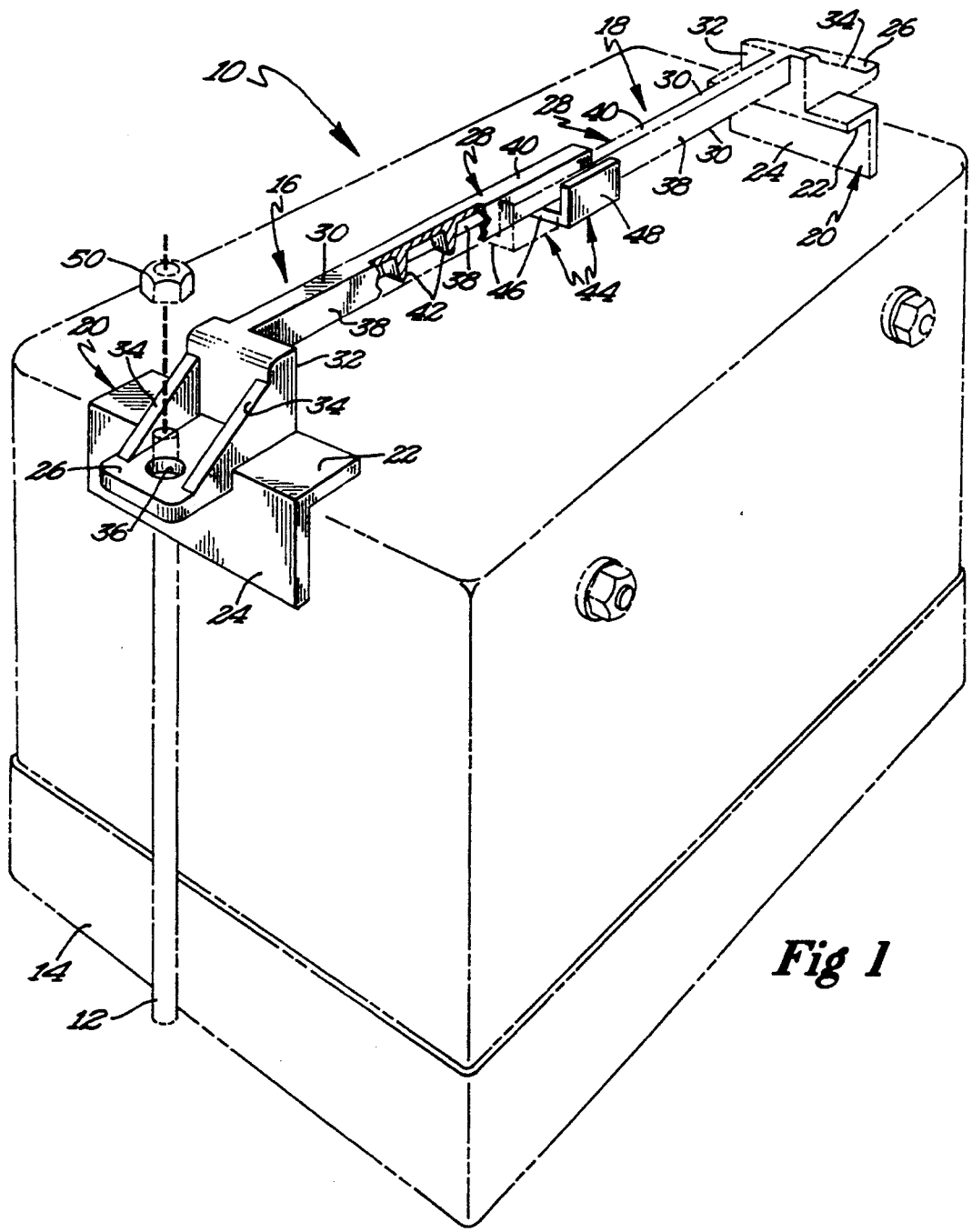
FIG. 1 shows a perspective view of a battery restraining device including a battery holddown according to the preferred teachings of the present invention, with portions shown in phantom to show constructional details.

The Figure is drawn for ease of explanation of the basic teachings of the present invention only; the extensions of the Figure with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

When the terms "top", "first", "second", "side", "vertical", "horizontal", and similar terms are used herein, it should be understood that these terms have reference only to the structure shown in the drawings as it would appear to a person viewing the drawings and are utilized only to facilitate describing the invention.

DESCRIPTION

A battery holddown according to the preferred teachings of the present invention is shown in the drawings and generally designated 10. Holddown 10 in the most preferred form is used with a pair of upright bolts 12 which extend from a tray 14 which supports the desired battery. Bolts 12 and tray 14 can be of any conventional design such as those utilized in vehicles, heavy equipment, and like applications. Holddown 10 generally includes first and second battery brackets 16 and 18 which are of an identical construction in the most preferred form. Particularly, brackets 16 and 18 generally include L-shaped clamps 20. Clamps 20 each include a first portion such as a top plate 22 for abutting with the top of the battery and a second portion such as a side plate 24 for abutting with the side of the battery and extending generally perpendicular to top plate 22. Top and side plates 22 and 24 have a generally equal length, with the width of plates 24 being considerably larger than and in the most preferred form being generally double the width of plates 22. Clamps 20 each further include an ear 26 extending from side plate 24 in a direction opposite to top plate 22, in a preferred form generally perpendicular to side plate 24 and parallel to top plate 22, and in the most preferred form generally contiguously from top plate 22. In the preferred form, ear 26 has a length less than the length of plates 22 and 24, and in the most preferred form which is slightly more than one-half of the length of plates 22 and 24 and is centered intermediate the ends of plates 22 and 24. Ear 26 has a width generally equal to but slightly larger than the width of plate 22 and less than the width of plate 24.

Brackets 16 anti 18 each further include a cross rod 28 extending over the top of the battery. Each cross rod 28 includes a horizontal portion 30 which extends from the clamp 20 generally parallel to the top of the battery and of top plate 22 and particularly at a very small angle in the range of less than 15° and preferably at an angle in the order of 0° to 5° thereto. In the preferred form shown, cross rod 28 further includes a vertical portion 32 extending vertically upward from top plate 22 and in the most preferred form generally along the free edge thereof. Portion 32 has a width generally equal to ear 26 in the most preferred form and includes triangular shaped reinforcement webs 34 extending between portion 32 and top plate 22 and ear 26 adjacent to the edges of portion 32 and ear 26. An aperture 36 is formed in ear 26 for slideable receipt of the upper ends of bolts 12 and in the preferred form is centrally located between webs 34. Aperture 36 has an inner extent generally equal to the outer extent of plate 24 and an outer extent generally equal to that of webs 34.

Horizontal portion 30 is linear between its ends and has an elongated length which is less than the width of the battery and in the most preferred form has a width which is greater than one-half of the width of the battery. In the preferred form, portion 30 has a cross section of a parallelogram shape and particularly is generally U-shaped including first and second, vertical, parallel side walls 38 interconnected by a horizontal top wall 40. Reinforcing ribs 42 extend between side walls 38 and are attached to top wall 40. The outer extent of the first side wall 38 is generally equal to one-half the diametric extent of aperture 36, with the second side wall 38 located outwardly thereof. In the most preferred form, horizontal portion 30 extends generally adjacent to the upper edge of vertical portion 32.

Cross rod 28 further includes a land 44 extending from the first side wall 38 adjacent the free end of horizontal portion 30. Land 44 and the outer extent of the first side wall 38 define a channel which is horizontally displaced from horizontal portion 30 of cross rod 28. The channel is of a shape corresponding to the shape of the cross section of horizontal portion 30 and which is generally a right parallelogram in the preferred form. In the preferred form, the channel is generally U-shaped having an open upper end. Particularly, land 44 in the most preferred form is L-shaped and generally includes a horizontal support portion 46 having an upper surface located at a level generally equal to and extending from the lower extent of side walls 38. Land 44 further includes a vertical support portion 48 spaced from the first side wall 38 generally equal to the width of horizontal portion 30 for slideable receipt therebetween. In the preferred form, the channel is located on the opposite side of the center of aperture 36 than horizontal portion 30.

In the preferred form, brackets 16 and 18 are each of a one-piece construction and in the most preferred form are of an integral construction which is cast from synthetic material which is not subject to corrosion due to exposure to the acid and other contents of the battery and the environment.

Now that the basic construction of holddown 10 according to the preferred teachings of the present invention has been explained, the installation and subtle features of holddown 10 can be set forth and appreciated. Specifically, brackets 16 and 18 can be positioned to be opposite to each other with clamps 20 being generally parallel and with the outer extent of the first side walls 38 of portions 30 abutting and with portions 30 crossing each other at a nonlinear angle. At that time, brackets 16 and 18 can be moved such that portion 30 of bracket 16 is received in the channel defined by land 44 of bracket 18 and portion 30 of bracket 18 is received in the channel defined by land 44 of bracket 16, with portions 30 of brackets 16 and 18 being displaced from each other and extending generally linearly to each other. At that time, brackets 16 and 18 can be slid relative to each other until plates 24 are spaced from each other generally equal to the width of the battery. Brackets 16 and 18 can be positioned at that time on the battery with bolts 12 extending through apertures 36 and with plates 22 abutting with the top of the battery, plates 24 of brackets 16 and 18 abutting with the opposite sides of the battery, and horizontal portions 30 extending horizontally and parallel to the top of the battery. At that time, nuts 50 or the like can be threaded on bolts 12 to draw ears 26 and thus clamps 20 toward tray 14 to sandwich the battery between tray 14 and holddown 10.

The offset of portion 32 of cross rod 28 which is vertical in the most preferred form allows horizontal portion 30 to avoid obstructions such as fill caps on the top of the battery by passing over them in the most preferred form. It should be appreciated that cross rod 28 could be manufactured without an offset if such an advantage is not desired such as horizontal portion 30 could extend generally horizontally from clamps 20 without a vertical offset and pass between the fill caps on the top of the battery.

It should then be noted that although the channels defined by lands 44 are vertically open and allow sliding, brackets 16 and 18 are prevented from moving relative to each other and securely hold the battery. Specifically, sliding of brackets 16 and 18 together is prevented by the abutment of side plates 24 with the opposite sides of the battery and the sliding friction between horizontal portions 30 and lands 44 when placed under load due to the tightening of nuts 50 on bolts 12. Rotation of horizontal portions 30 in lands 44 is prevented by the non-rotatable shape of the cross sections of horizontal portions 30 and of the channels of lands 44, the abutment of the outer extent of the first side walls 38 of brackets 16 and 18, the abutment of the free edges of side walls 38 with the horizontal support portions 46 of lands 44 of brackets 16 and 18, and the abutment of top plates 22 with the top of the battery. The pivoting of horizontal portions 30 relative to each other with the free ends thereof moving toward the battery is prevented by the slideable receipt of horizontal portions 30 in lands 44 of the opposite bracket 16 or 18, the abutment of the inner edges of plates 22 with the top of the battery, the abutment of ears 26 with nuts 50, and possibly by the abutment of the free ends of horizontal portion 30 with the top of the battery and any obstructions thereon. The pivoting of horizontal portions 30 relative to each other with the free ends thereof moving away from the battery is prevented by the slideable receipt of the horizontal portions 30 in lands 44 of the opposite bracket 16 or 18, and the abutment of lower edges of side plates 22 with the opposite sides of the battery. Sliding of brackets 16 and 18 apart is prevented by bolts 12 extending through apertures 36 of ears 26 and the sliding friction between horizontal portions 30 and lands 44 when placed under load due to the tightening of nuts 50 on bolts 12. The pivoting of horizontal portions 30 relative to each other in planes parallel to the top of the battery is prevented by the abutment of the outer extent of the first side walls 38 together and with vertical support portions 48 of lands 44. It should be noted that movements will typically be combinations of those set forth above. Thus, holddown 10 according to the preferred teachings of the present invention resists relative movement between brackets 16 and 18 when nuts 50 are tightened on bolt 12 causing the channels to bind upon horizontal portions 30 of cross rods 28 of brackets 16 and 18 to prevent sliding and other relative movement therebetween to securely hold the battery.

It should be appreciated that the channels defined by lands 44 being open at their upper ends and equal to the width of the cross sections of horizontal portions 30 in the preferred form are advantageous according to the preferred teachings of the present invention. Specifically, brackets 16 and 18 can be easily assembled by simply pivoting and sliding together without the use of tools or any additional fastening steps such as bolting, bending, or otherwise connecting components together. In fact, the manufacturer could simply supply brackets 16 and 18 in pairs or in bulk to the user of holddown 10 who would assemble brackets 16 and 18 together at installation. In the event corrosion should occur between portions 30 and lands 44 after use, brackets 16 and 18 can be separated after removal from the battery by twisting portions 30 out of the open upper ends of the channels defined by lands 44 and specifically will not be locked together in a manner which would prevent adjustment for a different width battery.

It should be noted that the preferred placement of horizontal portion 30 relative to the center of aperture 36 is advantageous in that apertures 36 of brackets 16 and 18 are directly across from each other on opposite sides of the battery to align bolts 12.

Although brackets 16 and 18 in the most preferred form are shown as being of a cast, integral design, other constructions of holddown 10 according to the teachings of the present invention can be utilized. For example, a metal bar could be utilized for horizontal portion 30, could be bent to form any offset such as vertical portion 32, and could be bent into a loop to form ear 26 and aperture 36. Land 44 could be formed by bending the metal bar or as a separate piece attached such as by welding to the metal bar. An L-shaped piece could then be attached such as by welding to the metal bar to form clamps 20. A suitable coating could be applied to protect the metal from corrosion and other elements of the environment. Additionally, it can be appreciated that horizontal portion 30 and the channel formed by land 44 could have other types of cross sections such as horizontal portion 30 could have circular cross sections.

It should then be appreciated that holddown 10 according to the preferred teachings of the present invention can be utilized on batteries having different widths. Specifically, brackets 16 and 18 can be positioned relative to each other at a maximum spacing with lands 44 abutting with each other to a minimum spacing where the free ends of horizontal portions 30 and lands 44 abut with vertical portion 32 and/or clamps 20 of the opposite bracket 16 or 18, and at any of the spacings therebetween. Thus, battery holddown 10 of the present invention can hold batteries of differing widths between the maximum and minimum spacing thereof. Additionally, plates 22 and 24 of clamps 20 of the preferred form of the present invention are not dependent upon the length of the battery and thus battery holddown 10 of the present invention can hold batteries of differing lengths. Furthermore, brackets 16 and 18 can be manufactured with horizontal portions 30 of any desired length and cross sectional size to fit different ranges of battery widths. Further, although in the preferred form, horizontal portions 30 of brackets 16 and 18 are of the same length, bracket 16 could have horizontal portion 30 of a different length than horizontal portion 30 of bracket 18.

It should be noted that holddown 10 according to the teachings of the present invention can be utilized on batteries located in low clearance environments such as often provided in automobile engine compartments because holddown 10 is located closely adjacent and generally corresponds to the configuration of the top of the battery.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Holddown for a battery positioned in a battery tray, with the battery having a top and opposite sides, comprising, in combination: first and second brackets, with each of the brackets including a first part for abutting with the top of the battery, a second part for abutting with the side of the battery, and a cross rod extending over the top of the battery, with the first bracket including a channel for slidably receiving the cross rod of the second bracket and the second bracket including a channel for slideably receiving the cross rod of the first bracket; and first and second drawing means adapted to extend between the battery tray and the first and second brackets respectively for drawing the first and second brackets toward the battery tray to sandwich the battery between the battery tray and the first and second brackets, with the shape of the channels allowing the first and second brackets to be readily assembled and disassembled by pivoting and sliding the first and second brackets and binding upon the cross rods when the first and second brackets are assembled and drawn toward the battery tray to prevent sliding of the cross rods in the channels.

2. The holddown of claim 1 wherein the channels are horizontally displaced from the cross rods, with the cross rods of the first and second brackets being horizontally displaced from each other when the cross rods are slideably received in the channels and being vertically displaced from each other during assembly and disassembly.

3. The holddown of claim 2 wherein the channels are generally U-shaped having a horizontal support portion and open upper ends, with the spacing between the open upper ends being at least equal to the width of the horizontal support portion.

4. The holddown of claim 3 wherein the cross rods each include a first side wall and a land extending from the first side wall, with the channel defined by the first side wall and the land.

5. The holddown of claim 4 wherein the cross rods have cross sections of a right parallelogram shape, with the land being L-shaped and including the horizontal support portion and a vertical support portion spaced from and parallel to the first side wall.

6. The holddown of claim 4 wherein the first and second drawing means include ears extending from the second part in a direction opposite the first part, with each of the ears including an aperture having a center, with the center of the aperture located intermediate the first side wall of the cross rod and the channel.

7. The holddown of claim 6 wherein the first and second brackets are of identical construction.

8. The holddown of claim 6 wherein the cross rods each include a first portion having a first end extending vertically from the first part and a second end, and a second portion having a first end extending from the second end of the first portion, with the second portion including the first side wall of the cross rod.

9. The holddown of claim 3 wherein the cross rods each include a first portion having a first end extending from the first part and a second end, and a second portion having a first end extending from the second end of the first portion and a second end, with the second portion being linear between the first and second ends, with the second end of the first portion being offset from the first end of the first portion.

10. The holddown of claim 9 wherein the second end of the first portion is vertically offset above the first end of the first portion.

11. The holddown of claim 10 wherein the first and second drawing means include ears extending from the second part in a direction opposite the first part; and wherein the holddown further comprises, in combination: reinforcing ribs extending between the first portion and the ears.

12. The holddown of claim 1 wherein the first and second drawing means include ears extending from the second part in a direction opposite the first part, with the cross rods being integrally formed as a single piece with the ears.

13. The holddown of claim 1 wherein the cross rods each include a first side wall and a land extending from the first side wall, with the channel defined by the first side wall and the land.

14. The holddown of claim 13 wherein the cross rods have cross sections of a right parallelogram shape, with the land including a first support portion extending from the first side wall and a second support portion extending perpendicularly from the first support portion.

15. The holddown of claim 13 wherein the first and second drawing means include ears extending from the second part in a direction opposite the first part, with each of the ears including an aperture having a center, with the center of the aperture located intermediate the first side wall of the cross rod and the channel.

16. The holddown of claim 15 wherein the cross rods each include a first portion having a first end extending vertically from the first part and a second end, and a second portion having a first end extending from the second end of the first portion, with the second portion including the first side wall of the cross rod.

17. The holddown of claim 13 wherein the cross rods each further include a second side wall having an inside surface and an outside surface, with the cross rods each further including a top wall interconnecting the first and second side walls, with the first side wall including an outside surface and an inside surface, with the inside surfaces of the first and second side walls being spaced, with the outside surfaces of the first side walls of the first and second brackets abutting when the first and second brackets are assembled and with the outside surfaces of the second side walls of the cross rods of the first and second brackets abutting with the lands when the first and second brackets are assembled.

18. The holddown of claim 17 wherein the cross rods each further include reinforcing ribs extending between the inside surfaces of the first and second side walls.

19. The holddown of claim 1 wherein the cross rods each include a first portion having a first end extending from the first part and a second end, and a second portion having a first end extending from the second end of the first portion and a second end, with the second portion being linear between the first and second ends, with the second end of the first portion being offset from the first end of the first portion.

20. The holddown of claim 19 wherein the second end of the first portion is vertically offset above the first end of the first portion.

21. The holddown of claim 20 wherein the first and second drawing means include ears extending from the second part in a direction opposite the first part; and wherein the holddown further comprises, in combinations: reinforcing ribs extending between the first portion and the ears.

22. The holddown of claim 1 wherein the first and second brackets are of identical construction.

* * * * *